United States Patent
Sorenson

[15] 3,680,593
[45] Aug. 1, 1972

[54] VALVE

[72] Inventor: Gerald T. Sorenson, Hartland, Wis.

[73] Assignee: Systems Design Company, Inc., Milwaukee, Wis.

[22] Filed: Dec. 31, 1969

[21] Appl. No.: 889,567

[52] U.S. Cl. ...137/625.48, 137/625.64, 137/625.69, 251/324, 251/368, 285/110
[51] Int. Cl............................................F16k 11/07
[58] Field of Search ........138/42, 196, 260; 285/110, 285/137; 251/324, 368; 137/625.48, 625.64, 625.69, 625.68, 456, 375, 561, 608, 271, 625.66

[56] References Cited

UNITED STATES PATENTS

| | | | |
|---|---|---|---|
| 2,222,746 | 11/1940 | Kamenarovic | 285/137 X |
| 2,326,292 | 8/1943 | Dorman | 285/196 |
| 2,834,368 | 5/1958 | Gray | 137/271 |
| 2,889,089 | 6/1959 | Herrick et al. | 285/260 X |
| 3,217,400 | 11/1965 | Illesy et al. | 285/260 X |
| 3,283,784 | 11/1966 | Ruchser | 137/625.64 |
| 2,471,285 | 5/1949 | Rice | 137/625.68 |
| 2,910,081 | 10/1959 | Karbowniczek | 137/625.68 |
| 3,117,587 | 1/1964 | Willinger | 137/608 X |
| 3,154,102 | 10/1964 | Harris | 137/608 |

FOREIGN PATENTS OR APPLICATIONS

| | | | |
|---|---|---|---|
| 210,530 | 2/1924 | Great Britain | 251/324 |
| 931,956 | 7/1963 | Great Britain | 137/625.66 |

Primary Examiner—Henry T. Klinksiek
Attorney—John J. Byrne

[57] ABSTRACT

A valve assembly having a body of elastomeric material molded with ingress and egress passageways and the valve seats and the sealing means thereof are formed integrally with said body.

10 Claims, 14 Drawing Figures

INVENTOR
GERALD T. SORENSON
BY John J. Byrne
ATTORNEY

INVENTOR
GERALD T. SORENSON
BY John J. Byrne
ATTORNEY

VALVE

An important objective of this invention is to provide an elastomeric valve body that is cast integrally with valve seats and sealing means.

Another important objective of this invention is to provide a valve assembly wherein a sub-plate assembly is utilized as the housing for the elastomeric valve body.

A further objective of this invention is to provide a valve assembly having an elastomeric body in which the ports and passageways thereof are shaped at their terminal ends so as to provide a seal with a valve cover when the interior of the valve body is pressurized.

Another important objective of this invention is to provide a means wherein pilot pressures are communicated to the interior of the valve body through a surface channel formed in the surface of a valve body.

Another important objective of this invention is to provide a valve assembly including means whereby a valve body snaps into a sub-plate with automatic self-sealing.

A still further objective of this invention is to provide a novel annular sealing means for a valve assembly in which the sealing means is an annular ring extending into an annular chamber and said ring is integral with its valve body.

Another important objective of this invention is to provide a sealing means for a valve assembly which is comprised of a trapezoidal shaped annular groove formed in the valve body.

A further objective of this invention is to provide sealing means between a valve member and its passageway which does not bind at high pressures.

A still further objective of this invention is to provide an elastomeric valve body for the reception of a pilot spool which has at least one end extension acting as a core for an electrical armature and in which the shock transmitted to the armature is absorbed within the elastomeric valve body.

Another important objective of this invention is to provide a valve body with a resilient body liner.

These and other objects of the invention will become more apparent to those skilled in the art by reference to the following detailed description when viewed in light of the accompanying drawings wherein.

Figure 1:
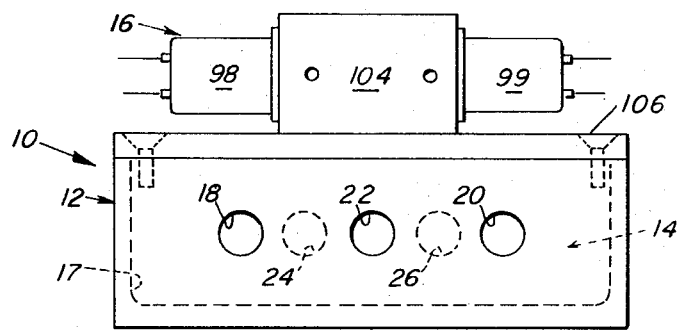
FIG. 1 is a front elevation of a valve assembly.
Figure 5:
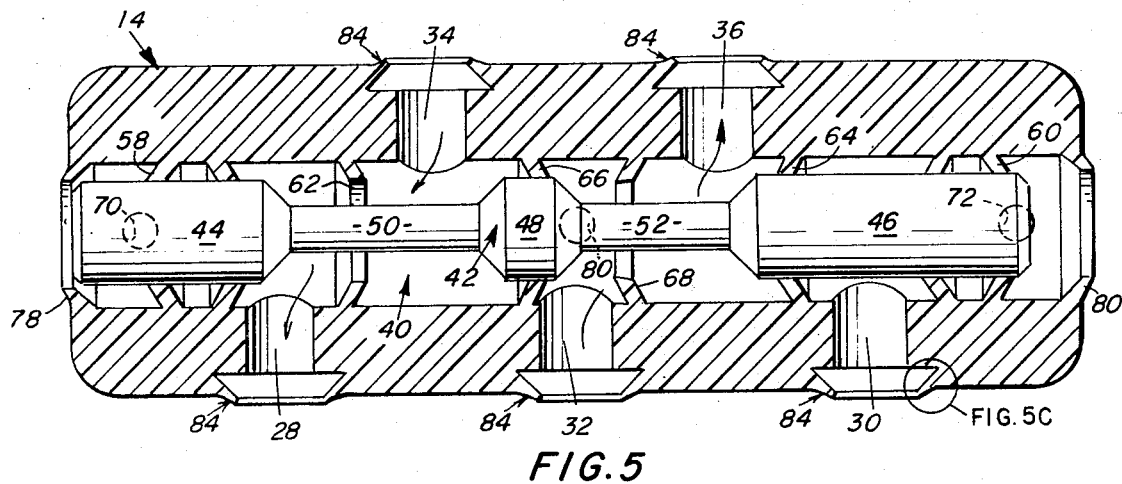
FIG. 5 is a cross-sectional view along the line 5—5 of FIG. 4.
Figure 5A:
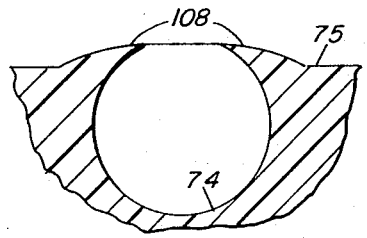
Figure 5B:
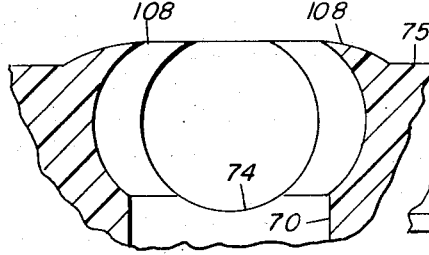
Figure 5C:
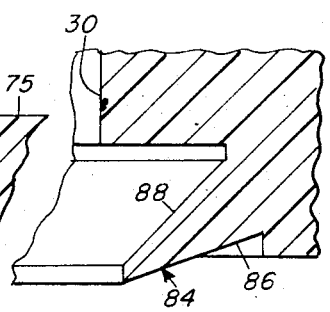
Figure 6:
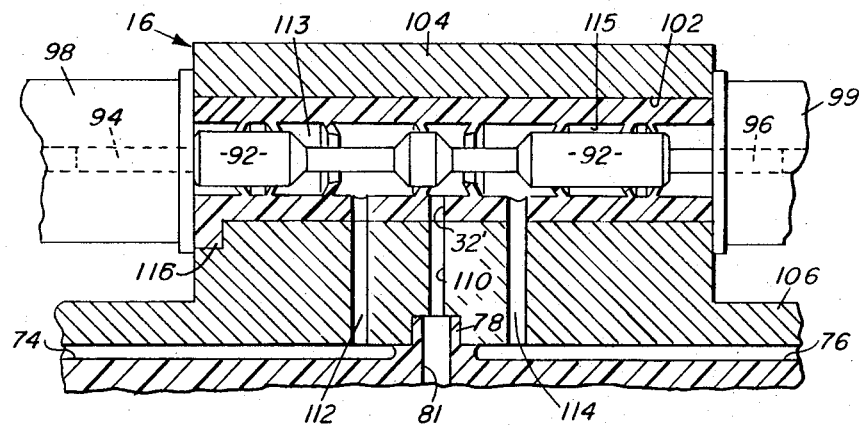
Figure 7A:
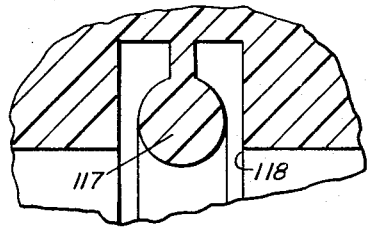
Figure 7B:
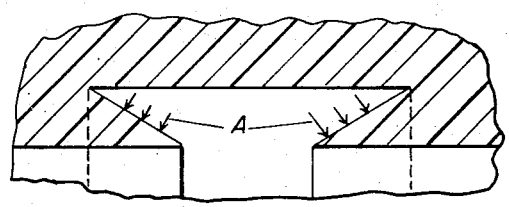
Figure 8:
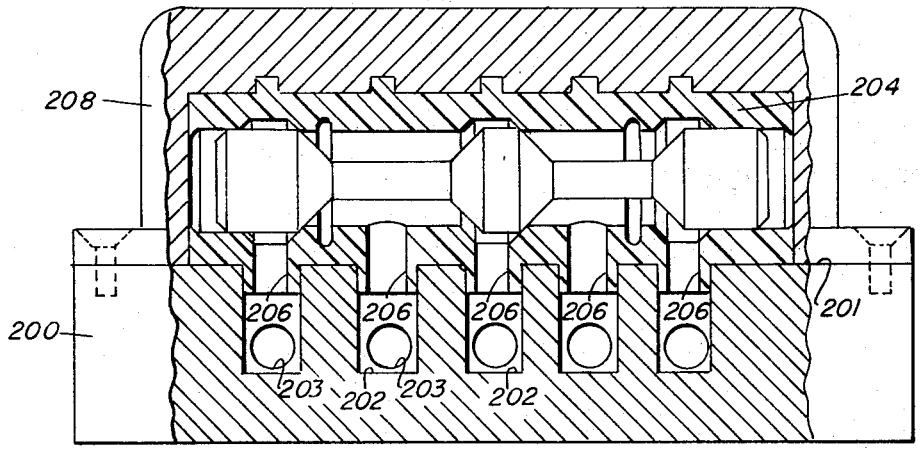
Figure 9:
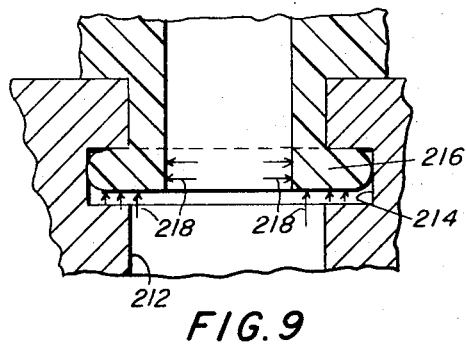
Figure 7C:
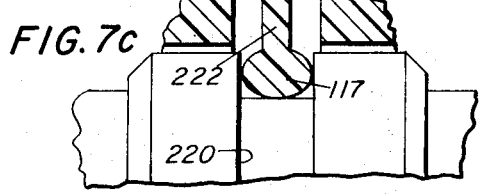

FIGS. 5a, 5b, and 5c are enlarged views of portions of FIG. 5;

FIG. 6 is a longitudinal cross-section of the pilot valve of FIG. 1;

FIGS. 7a–7c are cross-sectional views of modified forms of the seal of the valve assembly of this invention;

FIG. 8 is a cross-sectional view of a modified form of the valve assembly of this invention; and FIG. 9 is a fragmentary cross-sectional view of a modified form of the valve assembly of FIG. 8.

Referring now to the drawings wherein like numerals indicate like parts, the valve assembly of this invention is indicated by the numeral 10. The assembly is comprised generally of a sub-plate 12, an elastomeric valve body 14 and a pilot valve 16.

The sub-plate, normally of a metallic material, is formed with a cavity 17 for closely receiving the body 14. The cavity 17 opens to an upper surface of the sub-plate. An adjacent surface is formed with exhaust ports 18 and 20 and a pressure port 22. In an opposite side, the sub-plate is formed with exhaust ports 24 and 26. These ingress and egress ports can be threaded or formed with any suitable fitting for the reception of fluid handling conduits.

The elastomeric valve body 14 is formed with ports 28 and 30 which respectively communicate with exhaust ports 18 and 22. A pressure port 32 aligns with the pressure port 22 of the sub-plate. Bores 34 and 36 of the body 14 respectively mate with the cylinder ports 24 and 26 of the sub-plate. An elongated passageway 40 is formed in the valve body and extends throughout its length. Reciprocally received within this passageway is a valve member 42. This valve member includes a pair of end lands 44, 46 and a middle land 48. On opposite sides of the land 48, the valve member 42 is reduced in cross section at grooves 50 and 52. The lands 44 and 46, which also serve as end portions, are respectively engaged by end seals 58 and 60. Spaced inwardly of the end seals, are valve seals 62 and 64. Spaced inwardly of seals 62 and 64 are valve seals 66 and 68. For lack of a better term, the members 62, 64, 66, and 68 are referred to as seals but they could also be referred to as seats.

As can be seen best in FIG. 5, the seals 66 and 68 are located to sealingly engage with the peripheral surface of land 48 as it is moved longitudinally in passageway 40. The seals 66 and 68 are on either side of pressure port 32. The cylinder ports 34 and 36 are respectively outboard of the seals 66 and 68 and inboard of the seats 62 and 64. The exhaust ports 28 and 30 are respectively outboard of the seats 62 and 64 and inboard of the end seals 58 and 60.

As disposed in FIG. 5, the land 48 is in engagement with seal 66 and seal 64 is in engagement with land 46. In this position fluid from the pressure source in port 32 is diverted to cylinder port 36 and port 36 is sealed from tank port 30 by seal 64. If the valve member is moved to the right, land 48 will engage seal 68 and the pressure fluid is diverted to port 34 while port 34 is sealed from tank port 28 by seal 62.

Pilot pressure ports 70 and 72 are formed at either end of passageway 40 outboard of the end seals and communicate the ends of bore 40 to pilot pressure via the surface grooves 74 and 76 in the top surface 75 of the valve body 14. Inwardly of the grooves 74 and 76 is a nipple 78 having a passageway 80 leading to the interior of pilot valve 16.

The longitudinal ends of bore 40 are flanged outwardly at 78 and 80. Also note that the ingress and egress bores 28, 30, 32, 34, and 36 have flanges 84 formed by annular exterior grooves 86 and annular conical counterbores 88. The flanges 84 extend slightly beyond the peripheral surface of the valve body. The valve body 14 is adapted to be snugly received by the cavity 17. When inserted, the flanges 78 and 80 and the flanges 84 are compressed inwardly so as to develop an initial seal with the interior surface of the cavity. When the interior passageways of the valve body are pressurized, the elastomeric valve will expand so as to create a very tight seal between itself and the walls of the cavity.

In the valve assembly of FIGS. 1–6, the valve member 42 is reciprocated via the solenoid-operated pilot valve 16. The interior configuration of the pilot valve is smaller but similar to the main valve body 14. In the pilot valve 16, the valve spool 92 has end extensions 94 and 96 to provide cores for the armatures of solenoids 98 and 100. As can be seen in FIG. 6, the pressure port 32 of the valve body 14 is in communication with the pressure port 32' of the solenoid valve and the pilot passageways 70 and 72 are in communication with the passages 112 and 114. If for instance, in operation, an electrical armature signal moves the pilot spool 92 to the right, the pressure in 32' is transmitted through passageways 112', 74 and 70 to thereby move member 42 to the right. The pressure entering port 32 would be communicated to cylinder port 34. If the solenoid moves to the left, an opposite sequence of operation occurs.

Figure 2:
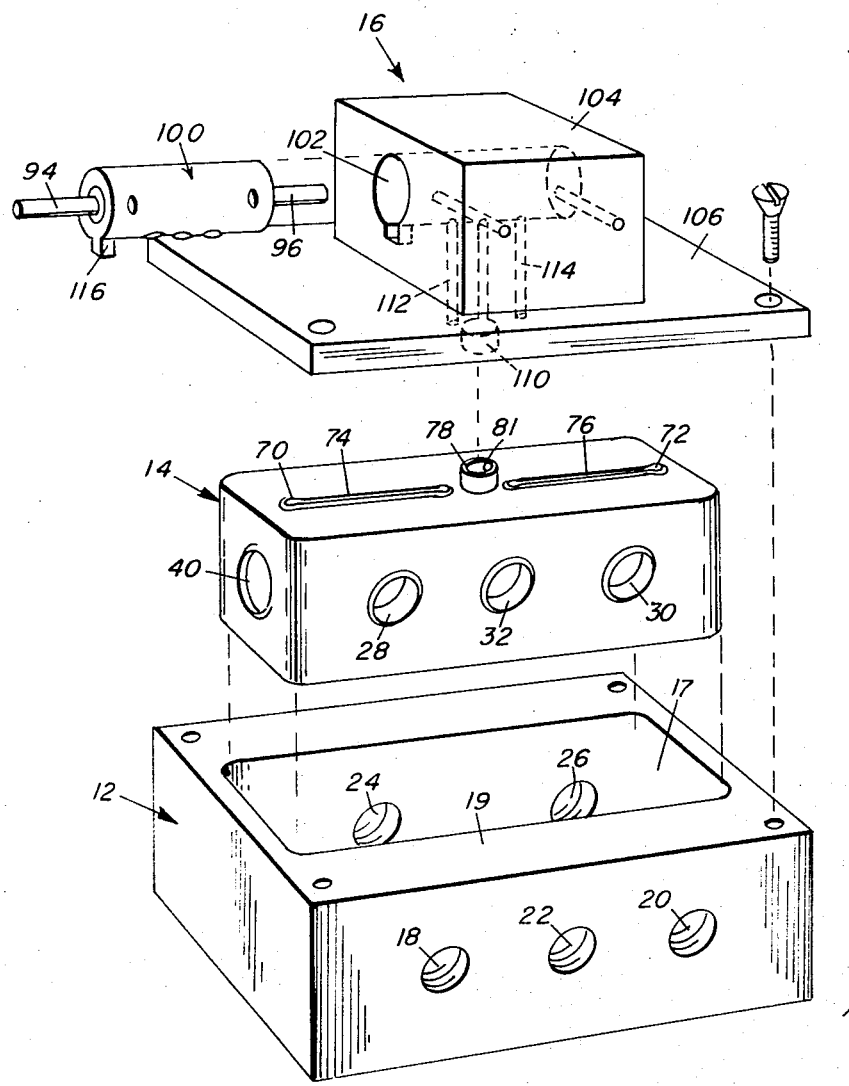
FIG. 2 is a partial exploded view of the assembly of FIG. 1.
Figure 3:
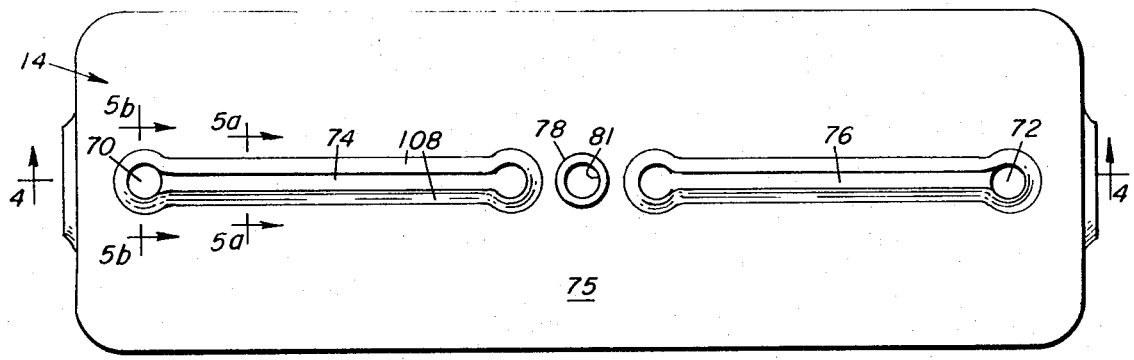
FIG. 3 is a top plan view of the valve body element of FIG. 1.
Figure 4:
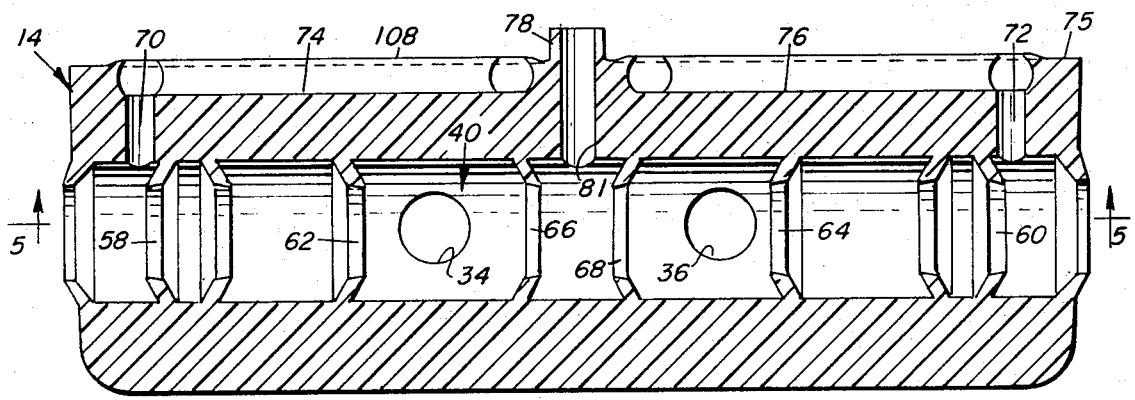
FIG. 4 is a cross-sectional view along the line 4—4 in FIG. 3.

The solenoids have been removed in FIG. 2 to better illustrate a cartridge-type elastomeric valve body 100 that is readily insertable into a bore 102 formed in the pilot body housing 104. The housing 104 includes a lower plate 106 which is firmly affixed to the sub-plate 12 by bolts or the like. As seen in FIG. 5b, the grooves 74 and 76 are formed with flanges 108 which sealingly engage the surface of plate 106. The nipple 78 is received by counterbore 110. The plate and pilot body are also formed with pilot passageways 112 and 114. The cartridge is keyed at 116 for proper alignment.

In the embodiments of FIGS. 1–6, there has been described a valve assembly which self-seals with outer casings by casting its valve seats and seals in an elastomeric valve body. These integral seals can be cast in a variety of configurations depending on the functions to be performed and the materials to be used. FIG. 7a and 7c illustrate a captive O-ring principle while FIGS. 7b and 7c illustrates a trapezoidal groove principle. In FIG. 7a the O-ring 117 is prevented from extruding out of its groove 118 because it is integral with the valve body. The trapezoidal seal of FIG. 7b is particularly effective because of the pressures on the remote-from-pressure flap as indicated by the arrows A.

A further embodiment of the invention is shown in FIG. 8. Here there is shown a sub-plate 200 which is formed with series of bores 202 which are equipped to handle pressurized fluids in a conventional manner. Disposed over the sub-plate 200 is an elastomeric valve body 204 formed with a plurality of nipples 206. The nipples are snugly received by the bores 202. Disposed over the valve body is a cover 208. Bores 202 are slightly undersized with respect to nipples 206 but can be inserted easily by hand. Frictional engagement will retain the body in place. When the interior of the valve body is pressurized the nipple sidewalls will be pushed radially toward the bore surface to thereby make a tight seal. Valve operation can be easily understood by reference to my U.S. Pat. No. 3,587,156, dated June 28, 1971.

FIG. 9 discloses a bore 212 having an undercut 214 for receiving a peripheral flange 216 formed at the ends of the nipples.

The flange 216 is sufficiently resilient to be forced through the bore 202. When in place it provides a very tight seal when pressure is applied.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A valve assembly comprising a subplate manifold having a plurality of openings to a first surface thereof,
   a valve body of a material of greater resiliency relative to said subplate manifold and having a central bore and a plurality of ports in a surface thereof extending from said bore,
   means attaching said valve body to said subplate manifold with said ports being in alignment with said openings,
   a valve member reciprocably received in said bore for selectively opening and closing said ports,
   flanges of the material of said valve body surrounding each of said ports and sealingly engaging said subplate and surrounding said openings, said flanges being flared inwardly toward the centers of said ports and outwardly of said valve body surface, and sealing means on the interior surfaces of said bore sealingly engaging said valve member.

2. The valve assembly of claim 1 wherein said subplate includes a cavity for receiving said valve body, said first surface being located in said cavity, and wherein said attaching means is a cover attached to said subplate enclosing said cavity.

3. The valve assembly of claim 1 wherein said sealing means includes annular flanges directed angularly and radially inwardly of said bore and engaging said valve member.

4. The valve assembly of claim 1 wherein said sealing means comprises trapezoidal grooves in said bore spaced axially thereof, each being defined by a pair of resilient deformable pressure flaps comprising opposed, annular flanges extending axially inwardly toward the center of said grooves and having free ends in spaced relationship defining an annular passageway between said groove and said bore, said flaps being in sealing engagement with said valve member.

5. The valve assembly of claim 1 wherein said sealing means comprises radially inwardly extending resilient annular flanges each received respectively in an annular groove in said bore, and an O-ring seal attached to each of said flanges and sealingly engaging said valve member.

6. The valve assembly of claim 5 wherein said valve member has a plurality of annular grooves therein for receiving said O-rings.

7. A valve assembly comprising a subplate manifold having a plurality of openings to a first surface thereof, a valve body having a central bore and a plurality of ports in a surface thereof extending from said bore,
   hollow nipples resilient relative to said subplate extending from said ports exteriorly of said body,
   means attaching said valve body to said subplate manifold with said ports and openings being aligned whereby said nipples are received in said openings with the exterior surfaces of said nipples sealingly engaging the interior surfaces of said openings, and a valve member reciprocably received in said bore for selectively opening and closing said ports.

8. The valve assembly of claim 7 wherein each of said openings has an annular groove therein, and including a radially, outwardly extending resilient flanges on each of said nipples, said annular grooves receiving said flanges when said nipples are received in said openings.

9. A valve comprising a valve body having an elongated central bore therein, axially spaced fluid pressure and emission ports opening into said bore, a reciprocating valve member received in said bore for selectively opening and closing said ports, a plurality of annular sealing means spaced axially of said bore and including radially, inwardly extending resilient annular flanges each received respectively in an annular groove in the wall of said bore, and an O-ring seal attached to each of said flanges and sealingly engaging said valve member.

10. A valve assembly comprising a subplate manifold having a cavity with an open end, and having a plurality of openings to a first surface of said cavity, a unitary valve body of an elastomeric material received in said cavity and having a central bore and a plurality of ports in a surface thereof extending to said bore and being aligned with said openings in said subplate manifold, a valve member reciprocably received in said bore for selectively opening and closing said ports, first sealing means integrally formed on said valve body and surrounding said ports and in sealing engagement with said subplate around said openings, and second sealing means formed on the wall of said central bore and sealingly engaging said valve member, and a cover member attached to said subplate and closing said open end of said cavity and limiting the expansion of said body at said open end when said valve body is pressurized.

* * * * *